(12) United States Patent
Eriksson et al.

(10) Patent No.: US 6,479,907 B1
(45) Date of Patent: Nov. 12, 2002

(54) PLANT FOR GENERATING ELECTRIC POWER AND A METHOD FOR OPERATION OF SUCH A PLANT

(75) Inventors: Kjell Eriksson, Ludvika (SE); Sune Wik, Ludvika (SE)

(73) Assignee: ABB AB, Vasteras (SE)

( * ) Notice: Subject to any disclaimer, the term of this patent is extended or adjusted under 35 U.S.C. 154(b) by 79 days.

(21) Appl. No.: 09/674,036

(22) PCT Filed: Jun. 2, 2000

(86) PCT No.: PCT/SE00/01151

§ 371 (c)(1),
(2), (4) Date: Oct. 25, 2001

(87) PCT Pub. No.: WO01/18937

PCT Pub. Date: Mar. 15, 2001

(30) Foreign Application Priority Data

Sep. 6, 1999 (SE) .................................. 9903125

(51) Int. Cl.[7] .............................. H02P 9/04; F03D 7/02; F03D 9/00; F03D 1/06
(52) U.S. Cl. .............................. 290/44; 290/55; 290/43; 290/42; 290/52
(58) Field of Search .......................................... 290/44

(56) References Cited

U.S. PATENT DOCUMENTS

| | | | | |
|---|---|---|---|---|
| 4,095,120 A | * | 6/1978 | Moran | 290/44 |
| 4,146,264 A | * | 3/1979 | Korzeniewski | 290/44 |
| 4,357,542 A | * | 11/1982 | Kirschbaum | 290/44 |
| 4,511,807 A | * | 4/1985 | Somerville | 290/44 |
| 4,565,929 A | * | 1/1986 | Baskin | 290/44 |
| 4,651,017 A | * | 3/1987 | Longigg | 290/44 |
| 4,695,736 A | * | 9/1987 | Doman | 290/44 |
| 4,703,189 A | * | 10/1987 | DiValentin | 290/44 |
| 6,137,187 A | * | 10/2000 | Mikhail | 290/44 |

FOREIGN PATENT DOCUMENTS

| | | |
|---|---|---|
| DE | 4232356 A1 | 3/1994 |
| WO | WO 97/45908 | 12/1997 |

* cited by examiner

Primary Examiner—Nestor Ramirez
Assistant Examiner—I A Mohandesi
(74) Attorney, Agent, or Firm—Dykema Gossett, PLLC

(57) ABSTRACT

In a plant for generating electric power through at least two generators separately driven by wind power and feeding an alternating voltage to an alternating voltage line in common, a converter is adapted to convert the alternating voltage into direct voltage and conversely. The plant has means (29, 30) adapted to measure the total power fed towards the converter from the wind power generators and members (32) adapted to send orders to a unit (14) adapted to control the converter (9) for adjusting the control thereof depending upon power values delivered by said means to such a frequency that a power maximum is obtained.

20 Claims, 2 Drawing Sheets

PLANT FOR GENERATING ELECTRIC POWER AND A METHOD FOR OPERATION OF SUCH A PLANT

FIELD OF THE INVENTION AND PRIOR ART

The present invention relates to a plant for generating electric power comprising at least two generators separately driven by wind power and adapted to feed an alternating voltage to an alternating voltage line in common, a converter adapted to convert alternating voltage into direct voltage and conversely connected with its alternating voltage side to said alternating voltage line, a unit adapted to control the switchings of power semiconductor devices included in a converter and thereby the frequency of the alternating voltage on the alternating voltage line from the generators and an arrangement adapted to determine optimum frequency of the voltage on the alternating voltage line for the wind conditions prevailing, with respect to the maximum power that may be generated by the plant, and send orders to the unit to control the converter for obtaining this frequency of said alternating voltage, as well as a method for operation of such a plant according to the preamble of the appended independent method claim.

The invention is not restricted to any particular ranges with respect to the power and voltage levels.

The magnitude of the power delivered by an individual wind power generator depends upon the wind velocity and the frequency of the alternating voltage delivered by the generator. Thus, for a given wind velocity there is a maximum for the electric power that may be delivered by the individual wind power generator at a given frequency. This frequency increases with the wind velocity. The frequency of the alternating voltage line is determined through the control of the converter by the unit. Thus, the frequency of the alternating voltage received from the different wind power generators of the plant will be just as high.

A large amount of wind power generators may be included in a plant of this type, and these may together form a so called wind power park and be distributed over a land and/or water (usually sea) region of a not neglectible area. This means in its turn that the different wind power generators will operate with different local wind velocities, so that it will not be evident which frequency is to be chosen for delivering a maximum power on the alternating voltage line to the converter.

In a plant of the type defined in the introduction and already known it has been tried to solve this problem by providing said arrangement with members measuring the different local wind velocity, whereupon an estimate of a so called average wind velocity is made, and this then forms a basis for a calculation of the frequency in common to the alternating voltage of the wind power generators. However, it has turned out that this method is not as precise as desired, since such an average wind velocity is sometimes a too coarse measure of the optimum frequency with respect to the output power delivered. This means that not neglectible amounts of energy are then wasted for nothing.

SUMMARY OF THE INVENTION

The object of the present invention is to provide a plant and a method making it possible to increase the efficiency of a plant of the type defined in the introduction, so that a frequency of said alternating voltage resulting in a maximum total power output from the wind power generators may be selected as the basis for the control of the converter under the most varying wind conditions.

This object is according to the invention obtained by providing said arrangement in such a plant with means adapted to measure the total power fed from the wind power generators towards the converter and members adapted to send orders to the unit for adjusting the control of the converter depending upon power values delivered by said means so that a power maximum is obtained.

By delivering a value through measurement in this way of the total power delivered by the wind power generators together at a given location and adapt the control of the converter so that a maximum of the power measured is obtained the optimum frequency of the alternating voltage for each given wind condition may really be selected. It has turned out that the power that may be delivered by the plant may be increased by 5–15% with respect to the determination of an average in velocity already known through such a determination of a power maximum, which corresponds to 15–30% increase with respect to the case of a plant having a fixed predetermined frequency. Thus, the frequency may in this way perhaps not be exactly an optimum for any of the wind power generators, but it will be the best for their total ability to generate electric power. It is here pointed out that the patent claim definition "measure the total power fed towards the converter from the wind power generators" is not to be interpreted as a restriction of the invention to the case of a direct measurement of this power, but it is well possible that other quantities, such as voltage and current intensity, are measured and the power is determined on the basis thereof, and it may then be said that the power is measured indirectly.

According to a preferred embodiment of the invention said members of the arrangement are adapted to compare power values delivered by said means at different frequencies of the alternating voltage and elaborate orders to said unit for controlling the converter on the basis of the result of this comparison. The frequency for a power maximum may under given conditions comparatively easily be determined by proceeding in this way.

According to another preferred embodiment of the invention said members of the arrangement are adapted to send orders to the unit to change the frequency of the alternating voltage in a first direction, in an increasing or decreasing direction, and if the power measured by said means then increases send orders to continue the change of the frequency in said first direction, and if the power from a measurement carried out by said means decreases to the measurement following thereupon change the direction into an opposite second direction for the change of the frequency of the alternating voltage. The power maximum asked for may in this way be reliably determined. It may then be advantageous that the intervals of the changes of the frequencies between two subsequent measurements is made finer when a power maximum has been passed, i.e. when suddenly the power delivered decreases again. The regulation may be carried out intermittently, preferably at uniform time intervals, or it may proceed continuously for ensuring that the plant all the time operates at the maximum power that may be delivered.

According to another preferred embodiment of the invention the plant also comprises members adapted to detect the wind velocity close to at least one of the wind power generators and that said members of the arrangement are adapted to elaborate a start-control order for the control of the converter by the unit on the basis of the wind velocity detected corresponding to an optimum frequency of the alternating voltage calculated on the basis of the wind velocity. An arrival to the frequency lying close to said optimum frequency when starting the operation of a plant after an operation interruption, various disturbances of the regulation or the like, may be rapidly obtained by proceeding in this way, so that no power will be unnecessarily lost.

According to another preferred embodiment of the invention said means comprise members for measuring the current intensity and members for measuring the voltage on the alternating voltage line and members for calculating the power fed towards the converter from the. result of these measurements. This constitutes a way to achieve the power measurement according to the invention, which may be realized easily and thereby will be reliable and favourable from the cost point of view.

According to another preferred embodiment of the invention the plant comprises a transformer arranged along said alternating voltage line between the wind power generators and the converter for changing the level of the voltage arriving to the converter. Such a transformer enables the plant to deliver electric power having levels on the direct voltage side of the converter differing substantially from the voltage levels that may be delivered by the wind power generators. Thus, it may in this way for example be ensured that voltages advantageously high with respect to losses for power transmission over longer distances, maybe of several hundreds of kilovolts, may be obtained on the direct voltage side of the converter.

According to another preferred embodiment of the invention the converter is a so-called VSC-converter (Voltage Source Converter). This constitutes a particularly advantageous embodiment of the invention, since it is through such a converter possible to control the consumption of reactive power needed for the wind power generators. The direct voltage side of the converter is then preferably connected to a direct voltage network for transmitting electric power in the form of high voltage direct current (HVDC).

The invention also relates to a method for operation of a plant for generating electric power through at least two generators separately driven by wind power according to the appended independent method claim.

The advantages of such a method and of the preferred embodiments thereof defined in the dependent method claims appear as clear as desired from the discussion above of the different embodiments of the plant according to the invention.

Further advantages as well as advantageous features of the invention appear from the following description and the other dependent claims.

BRIEF DESCRIPTION OF THE DRAWINGS

With reference to the appended drawings, below follows a specific description of preferred embodiments of the invention cited as examples.

In the drawings.

DETAILED DESCRIPTION OF PREFERRED EMBODIMENTS OF THE INVENTION

Figure 1:
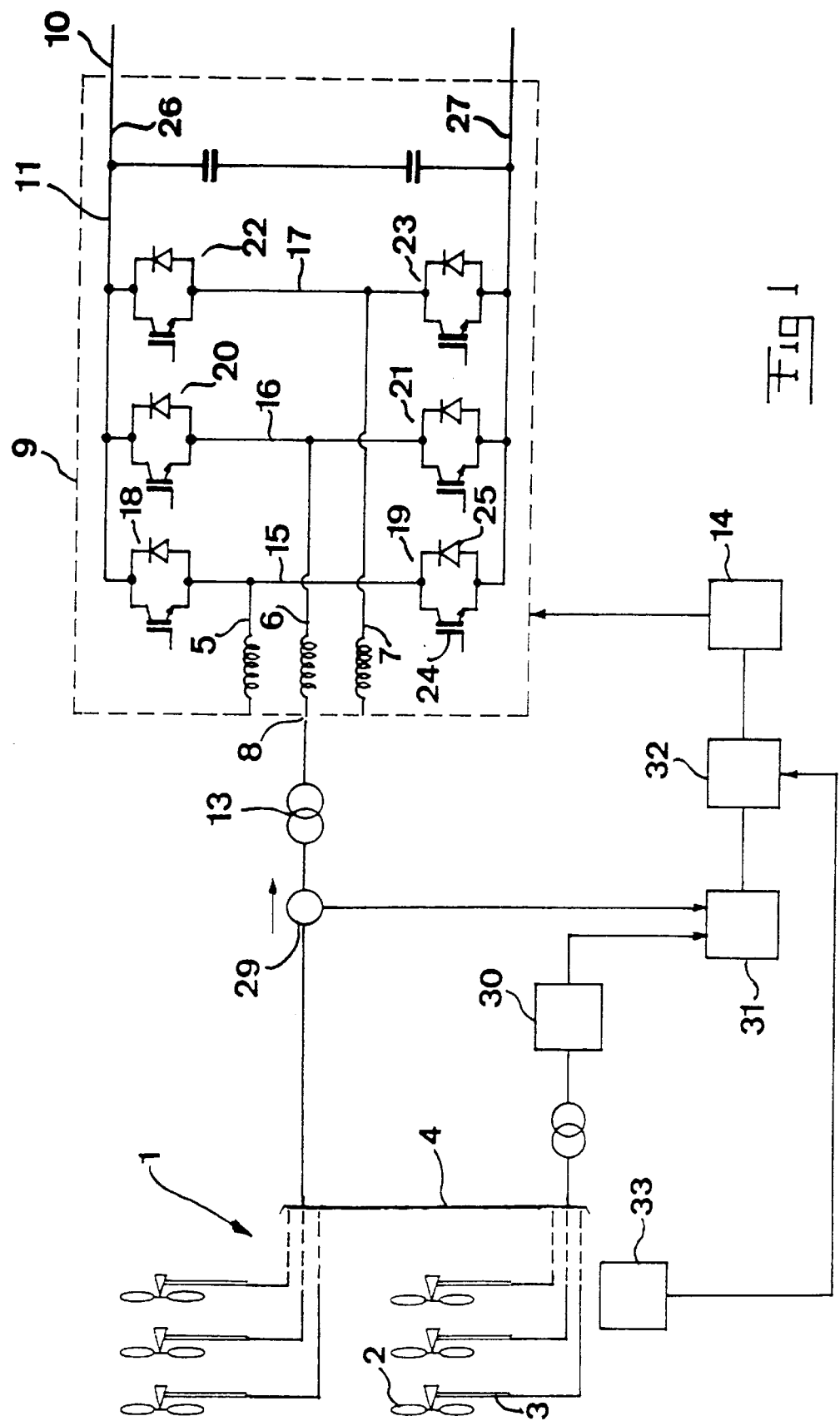
FIG. 1 is a very schematic sketch of a plant according to a first preferred embodiment of the invention.

The principle structure of a plant for generating electric power according to a first preferred embodiment of the invention is very schematically illustrated in FIG. 1. The plant has a wind power park 1 having wind power generators 3 separately driven by wind power and schematically indicate through their propellers 2. This wind power park may in practice be formed by a very high number of such so called wind power generators or plants, which may be distributed over a not neglectible land and/or water region. These may for example be positioned according to a 24×6 matrice pattern with a distance of for instance 300 meters between each short line and 500 meters between each long line. It is understandable that in such cases the local wind velocities existing at the different wind power generators between the park may differ quite a lot.

The wind power generators are connected to a line 4 in common, to which they deliver an alternating voltage having a certain frequency f. A three-phase voltage is then preferably generated, and it is indicated in FIG. 1 how the different phase conductors 5–7 of the alternating voltage line 4 are connected to the alternating voltage side 8 of a voltage stiff VSC-converter (Voltage Source Converter 9. The converter is adapted to convert the alternating voltage into a direct voltage and is on the direct voltage side 9 thereof connected to a direct voltage network 11 schematically indicated and for transmitting power through high voltage direct current (HVDC). This direct voltage network is usually much longer away connected to the direct voltage side of another converter 12 for converting the direct voltage into alternating voltage, which is then fed to consumers, but it is also possible that the converter 12 is close to the converter 9, as in a back-to-back-station. The direct voltage of the direct voltage network 11 is preferably very high, for example in the order of 100 kV–800 kV, for keeping the transmission losses on a low level, and a transformer 13 is arranged on the alternating voltage line 4 between the wind power generators and the converter 9 for obtaining this, since the wind power generators may deliver a voltage of 600–1500 V.

The converter 8 is controlled by a unit 14 in a way to be described more in detail while explaining the construction of the converter. The converter has three phase legs 15, 16, 17 each having two current valves 18–23, which each consists of at least a power semiconductor device of turn-off type, such as an IGBT 24, and a rectifying member in the form of a diode 25 connected in anti-parallel therewith. The phase legs are connected to a phase conductor 5–7 each of the three-phase alternating voltage line 4. The opposite end of the converter is connected to the direct voltage network 11 with a positive pole conductor 26 and a negative pole conductor 27.

Each current valve consists preferably of a high number of power semiconductor devices connected in series and rectifying members connected in anti-parallel therewith, and the power semiconductor devices of one single valve are adapted to be turned on and turned off simultaneously for functioning as one single switch, wherethrough the voltage across the valve will be shared by the different switches connected in series. The control of the switches takes place by pulse width modulation (PWM), which is achieved by the unit 14. The frequency of the alternating voltage existing on the alternating voltage side 8 of the converter is determined by the control of the unit 14, i.e. the frequency of the alternating voltage on the alternating voltage line 4 from the wind power generators. Thus, this frequency will be the same for all wind power generators. The frequency of the switching of the power semiconductor devices is considerably higher, for example a factor 40, than the frequency of the alternating voltage generated and may be one or some kHz.

Figure 2:
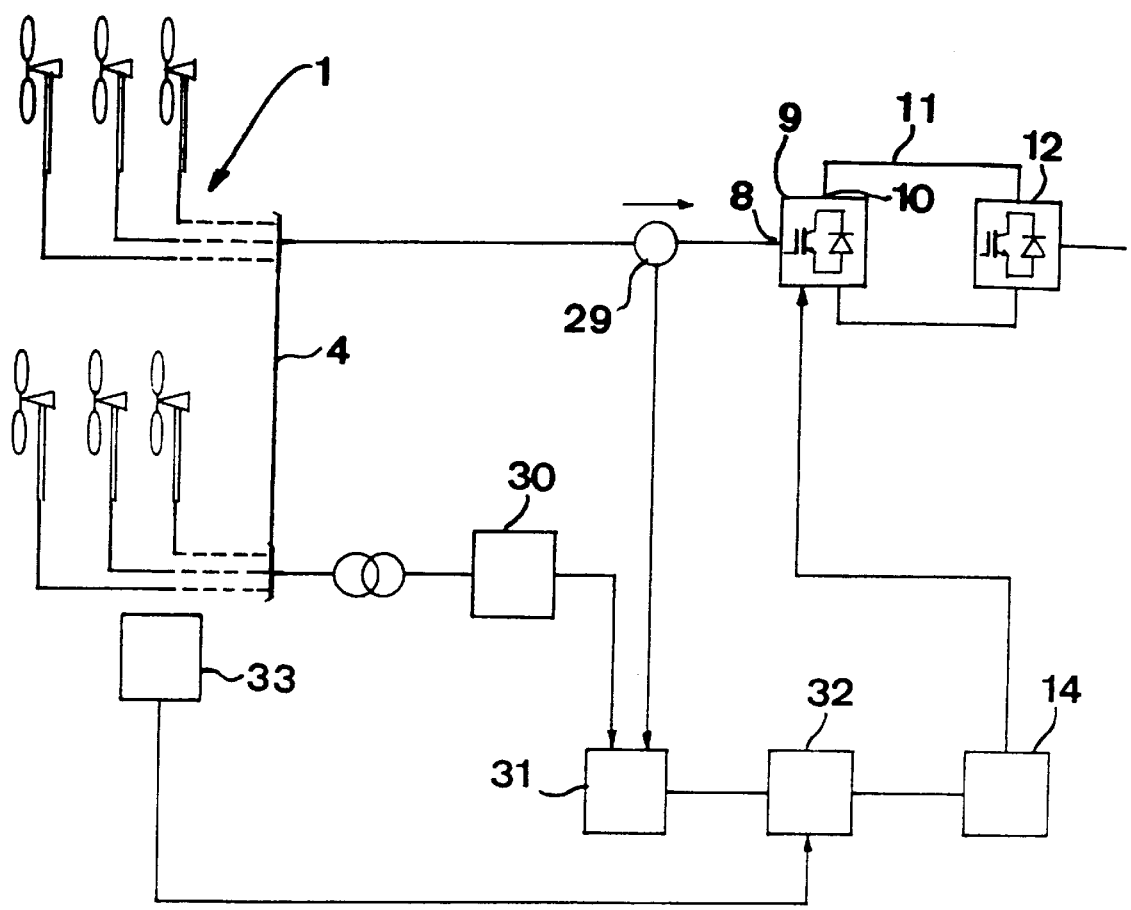
FIG. 2 is a sketch corresponding to FIG. 1 of a plant according to a second preferred embodiment of the invention.

The difference between the plant according to FIG. 1 and the one according to FIG. 2 is that the one in FIG. 2 has no transformer between the wind power park and the converter.

Figure 3:
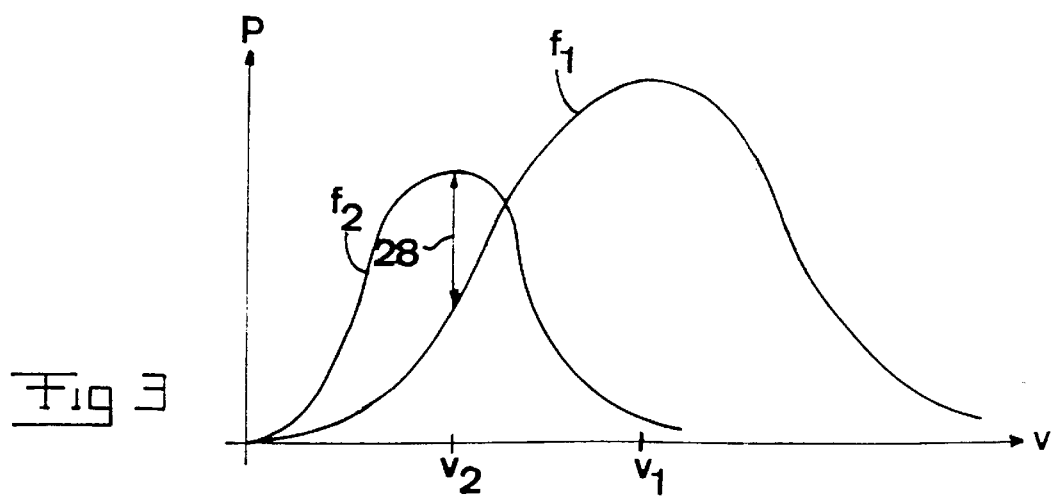
FIG. 3 is a graph illustrating the variation of the power delivered by a wind power generator with the wind velocity for different frequencies of an alternating voltage generated by the wind power generator.

Reference is now made to FIG. 3, which illustrates how the power that may be delivered by an individual wind power device, i.e. an individual generator, is dependent upon the frequency and the wind velocity. The power P is shown as a function of the wind velocity v for two different frequencies $f_1$ and $f_2$ of the alternating voltage on the output of the wind power generator. The frequency $f_1$ is here higher than the frequency $f_2$. These frequencies are normally in the order of 10–60 Hz.

It appears from these curves that for a given frequency of the alternating voltage network, i.e. at a certain control of the converter 9 through the unit 14, there is a certain wind velocity, for $f_1$ $v_1$, at which the output power will be maximum. If the wind velocity is higher than $v_1$ it will be suitable to retard the wind power propeller for keeping the power that may be delivered higher. It appears also that for a lower frequency $f_2$ the corresponding optimum wind velocity $v_2$ is considerably lower. Expressed otherwise, it may be said that for a given wind velocity there is an optimum frequency f. at which the power delivered by the wind power generator is maximum. The wind velocity instantaneously prevailing is determined by the external conditions, so that it is the frequency that should be varied for obtaining a maximum output power from the wind power generator at a certain wind velocity. This may be done by controlling the converter 9 in a suitable way through the unit 14. If for example the wind velocity would be $v_2$, but the frequency of the alternating voltage on the alternating voltage line 4 is $f_1$, a considerable increase of the output power could then take place by lowering the frequency to $f_2$, more exactly by the amount indicated by the line 28.

It will be easy to ensure that the output power will be maximum when only one wind power generator is present by simply measuring the wind velocity at the generator and control the converter 9 through the unit 14 depending upon the result of such a measurement. However, if the plant has a plurality of wind power generators, among which the local wind velocity may vary, the position gets considerably more complicated. Even if the wind velocity of all the wind power generators could be measured and any form of average wind velocity be calculated, this may nevertheless not, except for in some possible extreme exception situation, form a basis for determining the optimum frequency of the alternating voltage. It is exactly this problem which is to be solved by the present invention, and the new and characteristic features of the invention will now be described with reference to the different figures.

The plant according to the invention has an arrangement adapted to determine the optimum frequency of the voltage on the alternating voltage line 4 for the wind conditions prevailing, with respect to the maximum power that may be generated by the plant, and send orders to the unit 14 to control the converter 9 for obtaining this frequency of the alternating voltage. The arrangement has for this sake means adapted to measure the total power fed towards the converter from the wind power generators 3, which is achieved by the fact that these means has on one hand members 29 for measuring the current intensity and on the other members 30 for measuring the voltage on the alternating voltage line, which are arranged to deliver the measuring result thereof to a further member 31 adapted to calculate the power fed by the alternating voltage line towards the converter 9 from these results. The members 32 are also adapted to compare power values delivered by the member 31 at different frequencies of the alternating voltage and elaborate orders to the unit 14 for controlling the converter on the basis of results of this comparison. The members 32 are adapted to ensure that this frequency is set so that a maximum is obtained for the power fed towards the converter.

The search after this maximum may take place continuously or at certain predetermined time intervals. This search may advantageously take place in such a way that the members 32 send orders to the unit 14 to change the frequency of the alternating voltage in one first direction, in increasing or decreasing direction, and if the power measured by said means then increases send an order of a continued change of the frequency in the same first direction, and if the power from one measuring carried out by the means to the subsequent one decreases the direction is changed to an opposite second direction for changing the frequency of the alternating voltage, in which this continues until a maximum has been found. The interval between the frequency changes may advantageously be made finer when it is discovered that a maximum has been passed.

The plant may also have one or several power velocity detectors schematically indicated at 33, which is located close to one of the wind power generators 3 for delivering a wind velocity to the members 32, which are adapted to elaborate a start control order for the control of the converter by the unit on the basis of the wind velocity so detected corresponding to an optimum frequency of the alternating voltage calculated on the basis of the wind velocity, which means that the unit 14 already from the beginning of its control of the converter 9 after an operation interruption will come comparatively close to the optimum frequency, so that this may be found more rapidly and the power losses may be kept on a level being as low as possible.

The invention is of course not in any way restricted to the preferred embodiments described above, but many possibilities to modifications thereof will be apparent to a man skilled in the art without departing from the basic idea of the invention, such as defined in the claims.

The invention is for example applied already to plants having only two wind power generators separately driven, but it will probably be most useful at plants having a wind power park with a high number of wind power generators spread over a more considerable land and/or water region with mostly more or less large differences in local wind velocities between different wind power generators.

It is of course completely possible that the direct voltage side of the converter is connected to a converter included in the same station, i.e. that the second converter shown in the figures is located close to the first one, for feeding an alternating voltage on a high voltage network, in which the converters are then used for obtaining a frequency conversion, i.e. generating an alternating voltage with a desired frequency on the high voltage network and not any frequency that varies with the frequency of the alternating voltage from the wind power generators, i.e. with the wind velocity.

What is claimed is:

1. A plant for generating electric power comprising:
   at least two generators separately driven by wind power and adapted to feed an alternating voltage to an alternating voltage line in common, a converter having a plurality of switchable power semiconductor devices adapted to convert alternating voltage into direct voltage and conversely connected with its alternating voltage side to said alternating voltage line,
   a unit adapted to control the switching of the power semiconductor devices in the converter for controlling the frequency of the alternating voltage on the alternating voltage line from the generators;

and an arrangement adapted to determine an optimum frequency of the voltage on the alternating voltage line for the wind conditions prevailing, with respect to the maximum power that may be generated by the plant, and to send orders to the unit to control the converter for obtaining the optimum frequency of said alternating voltage, said arrangement comprising means adapted to measure the total power fed from the wind power generators towards the converter, and members adapted to send orders to the unit for adjusting the control of the converter depending upon power values delivered by said means so that a power maximum is obtained.

2. A plant according to claim 1, wherein said members of the arrangement are adapted to compare power values delivered by said means at different frequencies of the alternating voltage and elaborate orders to said unit for controlling the converter on the basis of the result of this comparison.

3. A plant according to claim 2, wherein said members of the arrangement are adapted to send orders to the unit to change the frequency of the alternating voltage in a first direction, in an increasing or decreasing direction, and if the power measured by said means then increases send orders to continue the change of the frequency in said first direction, and if the power from a measurement carried out by said means decreases to the measurement following thereupon change the direction into an opposite second direction for the change of the frequency of the alternating voltage.

4. A plant according to claim 3, wherein said members of the arrangement are adapted to reduce the interval between the frequencies associated with two subsequent changed orders sent to the unit for controlling the converter upon a transition from a power increase between two subsequent changed control orders to the unit to a power decrease after a third control order following thereupon indicated by said means, i.e. after passing a power maximum.

5. A plant according to claim 1 wherein said means are adapted to carry out so called first measurements of said power at time intervals after finding a power maximum and the members are adapted to send orders to the unit for adjusting the control of the converter in connection with each such first measurement for obtaining a power maximum.

6. A plant according to claim 1, wherein said means are adapted to carry out so called first measurements of said power at time intervals after finding a power maximum and the members are adapted to send orders to the unit for adjusting the control of the converter in connection with each such first measurement for obtaining a power maximum.

7. A plant according to claim 1, wherein it also comprises members adapted to detect the wind velocity close to at least one of the wind power generators and that said members of the arrangement are adapted to elaborate a start-control order for the control fo the converter by the unit on the basis of the wind velocity detected corresponding to an optimum frequency of the alternating voltage calculated on the basis of the wind velocity.

8. A plant according to claim 7, wherein members for measuring the wind velocity are arranged close to a plurality of the wind power generators and that the members of the arrangement are adapted to consider information about the wind velocity from a plurality of members detecting wind velocity when calculating said start control order.

9. A plant according to claim 1, wherein said means comprises members for measuring the current intensity and members for measuring the voltage on the alternating voltage line as well as members for calculating the power fed towards the converter from the result of these measurements.

10. A plant according to claim 1, wherein it comprises a transformer arranged along said alternating voltage line between the wind power generators and the converter for changing the level of the voltage arriving to the converter.

11. A plant according to claim 1, wherein the converter is a so-called VSC-converter (Voltage Source Converter).

12. A plant according to claim 1, wherein the direct voltage side of the converter is connected to a direct voltage network for transmitting electric power in the form of high voltage direct current (HVDC).

13. A plant according to claim 1, wherein the converter is adapted to operate at a voltage within the interval 5–500 kV.

14. A plant according to claim 1, wherein the plant is adapted to be able to deliver a power exceeding 100 kW.

15. A plant according to claim 1, wherein the at least two wind power generators are distributed over a predetermined area forming a power park.

16. A method for operation of a plant for generating electric power through at least two generators separately driven by wind power, said plant having a converter having a plurality of switchable power semiconductor services adapted to convert alternating voltage into direct voltage and conversely and connected through the alternating voltage side thereof to an alternating voltage line in common from said generators, and a unit for controlling switching of the power semiconductor devices in the converter and thereby the frequency of the alternating voltage on the alternating voltage line from the generators are controlled through said control unit and an optimum frequency of the voltage on the alternating voltage line for prevailing wind conditions, with respect to the maximum power that may be generated by the plant is determined, and the converter is controlled to generate the alternating voltage having the determining frequency said optimum frequency being determined by the steps of:

1) measuring total power fed from the wind power generators towards the converter, and 2) sending orders to said unit for adjusting the control of the converter depending upon the power values measured so that a power maximum is obtained.

17. A method according to claim 16, wherein power values measured at different frequencies of the alternating voltage in step 1) are compared and orders are elaborated to said unit for control of the converter on the basis of the result of this comparison.

18. A method according to claim 17, wherein orders to the unit for changing the frequency of the alternating voltage network in a first direction, in an increasing or decreasing direction, are elaborated, and if the power then measured increases orders of a continued change of the frequency in the same first direction are elaborated, and if the power from a measurement to a subsequent one decreases the direction is changed to an opposite second direction for the change of the frequency of the alternating voltage.

19. A method according to claim 16, wherein the current intensity and the voltage on the alternating voltage line are measured in step 1) and the power fed towards the converter is calculated from the result of these measurements.

20. A plant according to claim 1, wherein the arrangement is adapted to continuously search and keep the control of the converter through said means and members so that the total power delivered thereto by the wind power generators is maintained at a maximum.

* * * * *